Apr. 17, 1923.
L. JEFFRES
CULTIVATOR ATTACHMENT
Filed Aug. 17, 1921
1,451,697
2 sheets-sheet 1
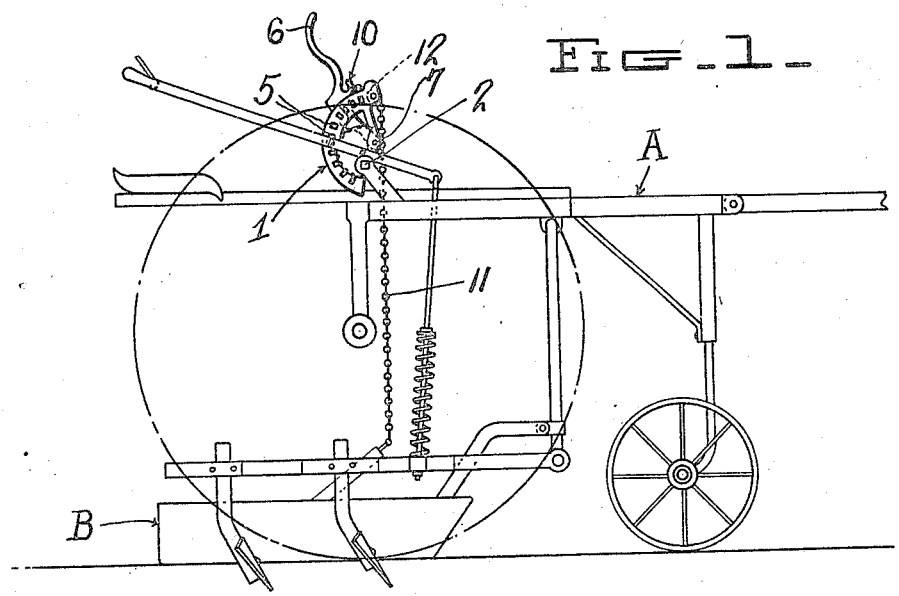
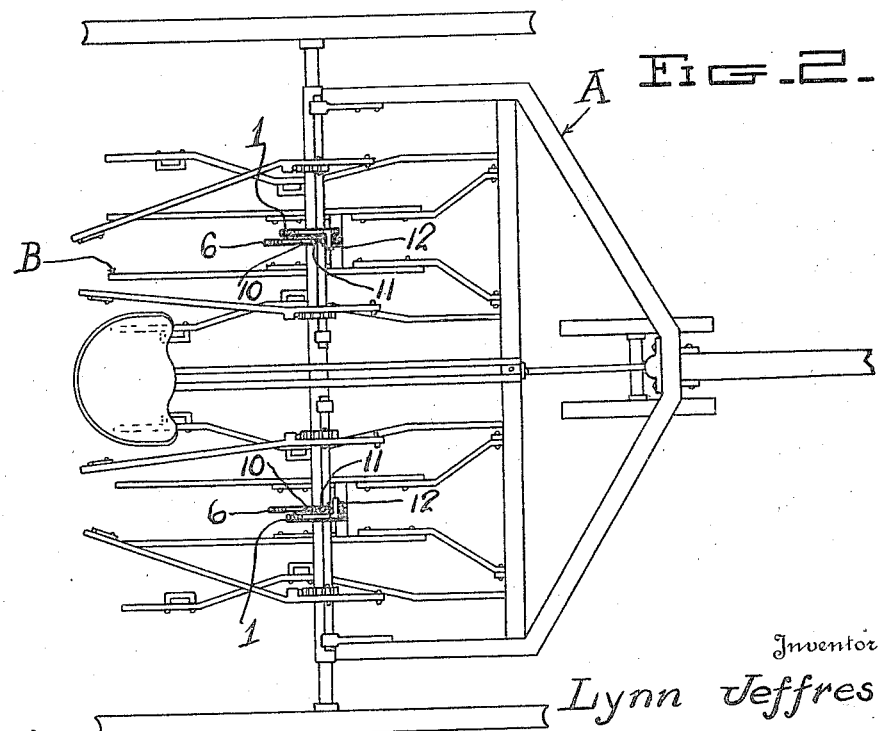
Inventor
Lynn Jeffres
By L. B. James
Attorney

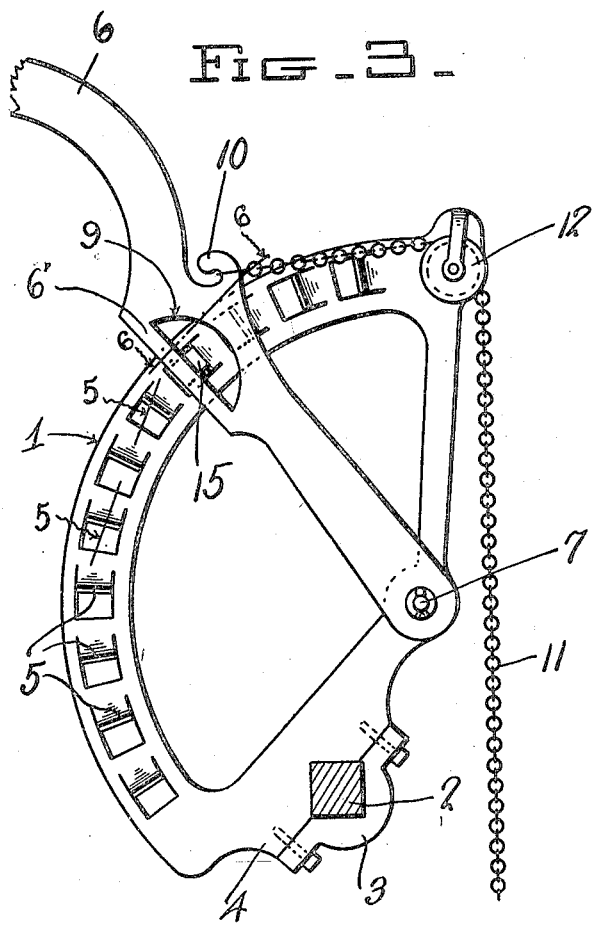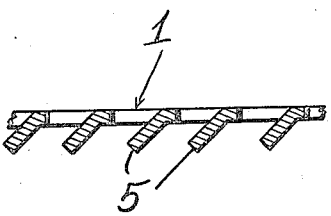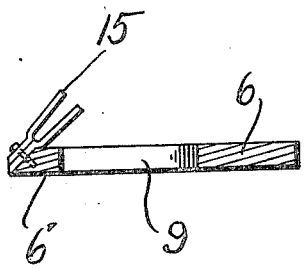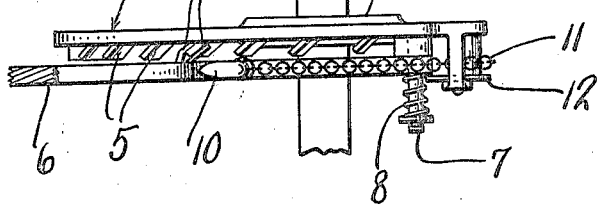

Patented Apr. 17, 1923.

1,451,697

UNITED STATES PATENT OFFICE.

LYNN JEFFRES, OF GREELEY, NEBRASKA.

CULTIVATOR ATTACHMENT.

Application filed August 17, 1921. Serial No. 492,942.

*To all whom it may concern:*

Be it known that I, LYNN JEFFRES, a citizen of the United States, residing at Greeley, in the county of Greeley and State of Nebraska, have invented certain new and useful Improvements in Cultivator Attachments, of which the following is a specification.

This invention relates to improvements in cultivators, the general object of the invention being to provide means for adjusting the guards or shields for the plows so as to regulate the amount of dirt thrown around the plants according to the size of the plants.

Another object of the invention is to so form the adjusting means that the device as a whole may be applied to existing models of cultivators, as well as new models, very easily and quickly.

A further object of the invention is to provide means whereby the adjustments may be made from the seat of the cultivator.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a two row cultivator with the invention in operative position thereon.

Figure 2 is a plan view thereof.

Figure 3 is an enlarged side view of the attachment.

Figure 4 is an enlarged plan view thereof.

Figure 5 is a section on line 5—5 of Figure 3.

Figure 6 is a section on line 6—6 of Figure 3.

In these views, A indicates generally a two-row cultivator and B the guards or shields thereof, which are designed to prevent the plants from being covered by the dirt thrown up by the plows of the cultivator.

As before stated, it is the object of my invention to make these guards or shields adjustable in order to regulate the amount of dirt thrown about the plants, and in carrying out my invention I provide a segmental plate 1, which is detachably connected to each side of the cultivator frame by the clamping bar 2. This bar is bolted to the plate which is formed with a removable clamping jaw 3, bolted to the stationary jaw 4, as shown. Teeth 5 are formed on one face of the plate, adjacent the curved edge thereof. These teeth are formed by making three cuts for each tooth and bending the metal between the cuts outwardly, as shown in Figures 3 and 5. A lever 6 has its lower end pivoted to the lower part of the plate by the pin 7, a spring 8 being arranged on the pin for yieldingly holding the lever against the plate. An opening 9 is formed in the lever and a bifurcated or two part pawl or dog 15 is secured to the strip 6', formed by said opening. The furcations of the pawl or dog are adapted to receive a tooth 5 between them so as to positively lock the lever against forward movement. Spring 8 permits the lever to be moved laterally to free the dog from the tooth. A hook 10 is formed on the lever and a chain 11 has one end connected with said hook and its other end is connected with a guard or shield. The chain passes over a guiding pulley 12 which is supported on the plate.

The upper ends of the levers 6 are located in convenient reach of the operator on the seat of the implement so that he can work either lever to raise or lower either guard and thus regulate the amount of dirt being thrown around the plants. The guards are adjustably supported as shown so that they can be moved by the chains.

By my invention the farmer can put just the right amount of dirt around the corn, or other plants, no matter how big or how small the plants are or how uneven, while keeping the plows in the ground all the time.

By having the clamping bar on each plate and connecting all the parts with the plate, the attachment can be placed on existing models of cultivators as well as on new models.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention what I claim is:—

1. The combination with a segment consisting of a metal plate having an arcuate portion, said arcuate portion being provided with radially disposed inclined ribs forming ratchet teeth, a lever pivoted concentric to the arcuate portion, and a fork member carried by said lever and positioned to straddle and engage the ribs selectively.

2. The combination with an arcuate segment consisting of a plate having portions cut out on three sides and bent up to form parallel projections constituting radial teeth; of a lever pivoted concentrically to said plate, and a fork carried by said lever and adapted for selectively straddling engagement with said teeth.

3. The combination with an arcuate segment consisting of a plate having portions cut out on three sides and bent up to form parallel projections constituting radial teeth; of a lever having one edge bevelled in a direction substantially parallel with the teeth, said lever being pivoted concentrically of the segment, and a fork having a shank fixed on the bevelled edge of the lever and arms projecting from the lever toward the segment, said arms being arranged for selectively straddling engagement with the teeth of the segment.

In testimony whereof I affix my signature.

LYNN JEFFRES.